United States Patent [19]

Gibler et al.

[11] Patent Number: 5,242,986
[45] Date of Patent: Sep. 7, 1993

[54] SELECTIVE PARTIAL HYDROGENATION OF CONJUGATED DIOLEFIN POLYMERS

[75] Inventors: Carma J. Gibler, Houston; Linda R. Chamberlain, Richmond; Ronald J. Hoxmeier, Houston, all of Tex.

[73] Assignee: Shell Oil Company, Houston, Tex.

[21] Appl. No.: 927,904

[22] Filed: Aug. 10, 1992

[51] Int. Cl.$^5$ .............................................. C08F 8/04
[52] U.S. Cl. ............................ 525/332.8; 525/332.9; 525/333.1; 525/338; 525/339
[58] Field of Search ............... 525/332.8, 332.9, 333.1, 525/338, 339

[56] References Cited

U.S. PATENT DOCUMENTS

| | | |
|---|---|---|
| 4,501,857 | 2/1985 | Kishimoto et al. |
| 4,673,714 | 6/1987 | Kishimoto et al. |
| 4,879,349 | 11/1989 | Hoxmeier |
| 4,994,508 | 2/1991 | Shiraki et al. |
| 5,017,660 | 5/1991 | Hattori et al. |
| 5,039,755 | 8/1991 | Chamberlain et al. |

FOREIGN PATENT DOCUMENTS

| | | |
|---|---|---|
| 0302505 | 2/1989 | European Pat. Off. |
| 0339986 | 11/1989 | European Pat. Off. |
| 0398758 | 11/1990 | European Pat. Off. |
| 62-209102 | 9/1987 | Japan |
| 62-209103 | 9/1987 | Japan |

OTHER PUBLICATIONS

"Coordination Catalysts for the Selective Hydrogenation of Polymeric Unsaturation" by John C. Falk, *Journal of Polymer Science: Part A-1*, vol. 9, pp. 2617-2623 (1971).

*Primary Examiner*—Bernard Lipman
*Attorney, Agent, or Firm*—Donald F. Haas

[57] ABSTRACT

This is a process for the partial hydrogenation of conjugated diolefin polymers which comprises polymerizing at least one conjugated diolefin with an organo alkali metal polymerization initiator in a suitable solvent thereby creating a living polymer comprising (1) ethylenic unsaturation between backbone carbons wherein at least one of the doubly bound backbone carbons is substituted and (2) ethylenic unsaturation which is not between doubly bound backbone carbons wherein at least one is substituted, terminating the polymerization, and effecting selective hydrogenation of the ethylenic unsaturation in the conjugated diolefin units of the terminated polymer which is not between doubly bound backbone carbons wherein at least one is substituted, by contacting the polymer with hydrogen in the presence of no more than 0.02 mM of catalyst per gram of polymer of a bis(cyclopentadienyl)titanium catalyst.

20 Claims, No Drawings

SELECTIVE PARTIAL HYDROGENATION OF CONJUGATED DIOLEFIN POLYMERS

FIELD OF THE INVENTION

This invention relates to a method for hydrogenating ethylenically unsaturated polymers and to polymeric materials which are hydrogenated by the process. More particularly, this invention relates to a method for selectively hydrogenating ethylenically unsaturated polymeric materials wherein a controlled amount of ethylenic unsaturation remains after hydrogenation.

BACKGROUND OF THE INVENTION

Polymers of conjugated diolefins are useful elastomeric polymers. These polymers contain a residual double bond from each diolefin monomer and this double bond provides a site for crosslinking, grafting or functionalization. Unfortunately, the double bonds are present in an excess over those generally required for these reactions. The unreacted double bonds provide sites for detrimental reactions which result in poor stability against U.V., oxidative and thermal degradation. When excellent stability is required, ethylenic unsaturation is reduced or eliminated by hydrogenation of the polymer. When both stability and reactive sites are required, it is desirable to have a controlled amount of unsaturation remaining in the polymer after hydrogenation.

Several processes to hydrogenate ethylenically unsaturated polymers are known. One class of process utilizes heterogeneous catalyst systems or carrier-supported metals. Metals known to be useful in this process include Ni, Pt, Pd, and Ru. This process can be low in activity and therefore may require high catalyst concentrations and long reaction times to obtain high levels of hydrogenation.

An improved hydrogenation process utilizes a homogeneous catalyst. Homogeneous catalysts can be prepared by combining an aluminum alkyl with a Group VIII metal carboxylate or alkoxide. The aluminum alkyl reduces the Group VIII metal and an aluminum Group VIII metal complex is formed. This hydrogenation process can be selective, hydrogenating ethylenic unsaturation but not hydrogenating aromatic unsaturation. With careful selection of hydrogenation conditions, this type of process can also be selective between different types of ethylenic unsaturation. U.S. Pat. No. 4,879,349 discloses such a selective process wherein specific process conditions result in selective hydrogenation of less sterically hindered ethylenic unsaturation while not hydrogenating a high level of the more sterically hindered ethylenic unsaturation. Faulk, in "Coordination Catalysts for the Selective Hydrogenation of Polymeric Unsaturation", *Journal of Polymer Science*, 9, 2617-23 (1971), also discloses a process (utilizing cobalt or nickel homogeneous catalysts) which can be selective between isoprene and butadiene unsaturation.

These processes require removal of the Group VIII metal from the hydrogenated polymer because the Group VIII metals can catalyze degradation of the hydrogenated polymer if left in the polymer. Removal is complicated and expensive due to the fine size of the colloidal catalyst suspension. It would therefore be advantageous to develop a process which would selectively hydrogenate different types of ethylenic unsaturation (i.e. butadiene and isoprene) and utilize a homogeneous catalyst which does not require a catalyst removal step.

SUMMARY OF THE INVENTION

The objects of this invention are achieved by a process to prepare a partially hydrogenate conjugated diolefin copolymer with a controlled amount of residual unsaturation, the process comprising the steps of:

a) copolymerizing a substituted conjugated diolefin monomer and an unsubstituted conjugated diolefin monomer to produce a copolymer comprising 1) ethylenic unsaturation between backbone carbons wherein at least one of the double bound backbone carbons is substituted and 2) ethylenic unsaturation which is not between double bound backbone carbons wherein at least one is substituted; and b) selectively hydrogenating the ethylenic unsaturation which is not between such doubly bound backbone carbons wherein at least one of the doubly bound carbons is substituted by contacting the copolymer with hydrogen in the presence of no more than 0.02 millimoles of catalyst per gram of copolymer of a catalyst having the formula:

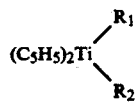

wherein $R_1$ and $R_2$ are the same or different and are selected from the group consisting of halogen groups, $C_1$-$C_8$ alkyl and alkoxy groups, $C_6$-$C_8$ aryloxy groups, aralkyl groups, cycloalkyl groups, silyl groups and carbonyl groups. Category 2) of unsaturation includes unsaturation which is in pendant groups to the backbone such as 1,2 or 3,4 polymerization as discussed below and unsaturation between backbone carbons which are not substituted as in 1,4-butadiene.

This process provides the benefits of a homogeneous hydrogenation catalyst and provides unexpected selectivity between types of ethylenic unsaturation. Monomers are selected to provide both types of unsaturation and the relative amounts of the monomers are selected so that the type of unsaturation can be controlled to result in a controllable amount of residual unsaturation in the copolymer which controls the polymer properties desired. In a preferred embodiment, the copolymer produced is a block copolymer comprising one or more vinyl aromatic hydrocarbon, preferably styrene, blocks. Preferably, the copolymer contains one or more isoprene/butadiene copolymer blocks which may be either polymerized sequentially or simultaneously. The controlled amount of residual unsaturation retained in the conjugated diolefin blocks can be utilized for crosslinking, grafting or functionalization.

DETAILED DESCRIPTION OF THE INVENTION

Polymers containing ethylenic unsaturation or both aromatic and ethylenic unsaturation may be prepared using an anionic initiator, Ziegler catalyst or other polymerization catalysts. Such polymers may be prepared using bulk, solution or emulsion techniques. When solution anionic techniques are utilized, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about 150° C. to about 300° C., preferably at a temperature within the range from about 0° C. to about 1000° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, carious alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetraline, decalin and the like; halogenated hydrocarbons, particularly halogenated aromatic hydrocarbons, such as chlorobenzene, chlorotoluene and the like; linear and cyclic ethers such as methyl ether, methyl ethyl ether, diethyl ether, tetrahydrofuran and the like.

The types of conjugated diolefins polymerized in the present invention, along with polymerization conditions, must be chosen so as to provide a mixture of unsaturation which will result in a predisposition to hydrogenation to the desired residual hydrogenation. Butadiene and other unsubstituted conjugated diolefins polymerize in the following manner;

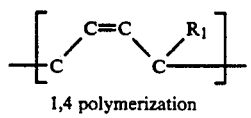

1,4 polymerization

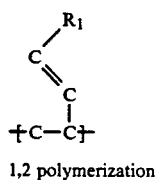

1,2 polymerization

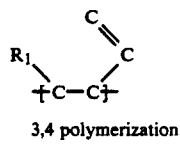

3,4 polymerization wherein $R_1$ is hydrogen for butadiene or an alkyl group for a higher unsubstituted conjugated diolefin. Each of these modes for polymerization result in residual ethylenic unsaturation which can be hydrogenated by the titanium based catalysts, but at significantly different hydrogenation rates.

When the conjugated diolefin is a substituted diolefin, the following possibilities of polymerization exist:

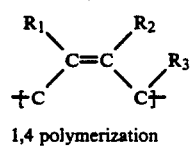

1,4 polymerization

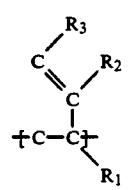

1,2 polymerization

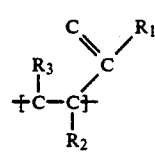

3,4 polymerization wherein $R_1$, $R_2$ and $R_3$ may be the same or different and may be hydrogen or alkyl groups, but either $R_1$ or $R_2$ must be an alkyl group. Only 1,4 polymerization of a substituted monomer such as isoprene results in backbone unsaturation between carbon atoms wherein at least one of the doubly bound carbons is substituted. This is the type of unsaturation which is selectively left unhydrogenated in the partial hydrogenation process of the present invention.

Isoprene is the preferred substituted conjugated diene. Other substituted dienes which may be used to produce backbone unsaturation between doubly bond carbons wherein at least one is substituted (and which will be selectively left unhydrogenated) include 2-ethyl-1,3-butadiene, 2-methyl-1,3-pentadiene, 2-ethyl-1,3-pentadiene, 2-methyl-1,3-hexadiene, 2-ethyl-1,3-hexadiene, 2-methyl-1,3-heptadiene, 2-ethyl-1,3-heptadiene, 2-methyl-1,3-octadiene, 2-ethyl-1,3-octadiene and the like. Butadiene is the preferred unsubstituted conjugated diene. Others include 1,3-pentadiene, 1,3-hexadiene, 1,3-heptadiene, 1,3-octadiene and the like.

In non polar solvents, such as cyclohexane, benzene and hexane, dienes generally polymerize with a predominantly 1,4 addition. Typically, isoprene will polymerize to 95% 1,4 addition and about 5% 3,4 addition in non polar solvents. Adding polar cosolvents, such as tetrahydrofuran or diethyl ether, or adding polar modifiers such as N,N,N',N'-tetramethylethylenediamine, increases 1,2 and 3,4 polymerization. The species of initiator and polymerization temperature also vary the mode of addition somewhat. For example, polymerization of isoprene in tetrahydrofuran with n-butyllithium as an initiator at 25° C. is reported to result in 11% 1,4 addition, 28% 1,2 addition and 61% 3,4 addition, whereas polymerization at 30° C. utilizing secbutyllithium is reported to result in 69% 1,4 and 31% 3,4 addition.

A single substituted conjugated diolefin, such as isoprene, can therefore be polymerized under conditions which result in sufficient ethylenic unsaturation which is and is not backbone unsaturation between carbons which are doubly bound wherein at least one is substituted to result in a polymer which can be selectively hydrogenated by the hydrogenation process of this invention to result in a useful partially hydrogenated polymer. But more typically, the substituted diolefin will be copolymerized with an unsubstituted conjugated diolefin to produce a higher 1,4 addition polymer. Polymers with higher 1,4 additions have properties more like natural rubbers and are generally preferable.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, which are incorporated herein by reference. Conjugated diolefin-alkenyl aromatic hydrocarbon copolymers which may be used in this invention also include block copolymers such as those described in U.S. Pat. Nos. 3,231,635; 3,265,765 and 3,322,856, which are incorporated herein by reference. Linear and branched block copolymers which may be used in the present invention include those which may be represented by the general formula:

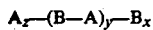

Wherein:
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 to 1;
y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, which are incorporated herein by reference. Coupled and radial block copolymers which may be treated in accordance with the present invention include those which may be represented by the general formula:

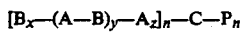

Wherein:
A, B, x, y and z are as previously defined; n and n' are, independently, numbers from 1 to about 100 such that $n+n' \geq 3$;
C is the core of the coupled or radial polymer formed with a polyfunctional coupling agent; and
Each P is the same or different polymer block or polymer segment having the general formula:

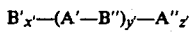

Wherein:
A″ is a polymer block containing predominantly monoalkenyl aromatic hydrocarbon monomer units;
B′ is a polymer block containing predominantly conjugated diolefin monomer units;
A′-B″ is a polymer block containing monoalkenyl aromatic hydrocarbon monomer units (A′) and conjugated diolefin monomer units (B″), the A′-B″ monomer units may be random, tapered or block and when A′-B″ is block, the A′ block may be the same or different from A″ and B″ may be the same or different from B′;
x′ and z′ are, independently, numbers equal to 0 or 1; and y′ is a number from 0 to about 15, with the proviso that the sum of $x'+y'+x \geq 1$.

Radial or star polymers with arms that are alike are referred to as symmetric polymers, whereas polymers which comprise two or more species of arms are referred to as asymmetric. Either type may be utilized in the present invention.

In the production of all of the polymers described above, the polymerization may be, and is preferably, terminated by utilizing hydrogen gas in place of the conventionally used alcohol terminating agent. The theoretical termination reaction is shown using an S-B-S block copolymer for exemplary purposes:

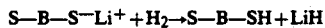

It is theorized that lithium hydride is formed during the termination process. Formed in this manner, it is not a reactive polymerization initiator. It is inert to polymerization and does not interfere with the molecular weight control of the next polymerization batch as alcohol termination of polymers can. This permits recycle of the solvent without an expensive purification process.

It is usually advisable to contact and vigorously mix the hydrogen termination gas with the polymerization solution at the end of the polymerization reaction. This contact and vigorous mixing can be effected by adding the hydrogen gas through spargers in a mixing vessel containing polymer solution. The time of contact should be at least about ten seconds and preferably about twenty minutes to allow sufficient contact time for the reaction to occur. This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in an appropriate solution and added to the polymer solution to be terminated. Another method would be to cause the hydrogen to be absorbed into an absorption bed and then cause the polymer solution to flow through the absorption bed. The hydrogen contact could also be carried out by adding a material which gives off hydrogen upon decomposition, i.e. diimide.

The problems of using alcohol, i.e. the formation of lithium alkoxides and excess alcohol impurities, are avoided when hydrogen termination is utilized. It has been found that if hydrogen termination is used, hydrogenation utilizing a bis(cyclopentadienyl)titanium catalyst may be performed without the necessity of a hydrocarbon lithium or alkoxy lithium promoter, whether added with the catalysts or present in the living polymer.

The hydrogenation step of the present process is carried out in the presence of a bis(cyclopentadienyl)-titanium compound of the formula:

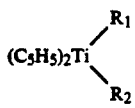

wherein $R_1$ and $R_2$ are the same or different and are selected from the group consisting of halogen groups, $C_1$-$C_8$ alkyl and alkoxy groups, $C_6$-$C_8$ aryloxy groups, aralkyl, cycloalkyl groups, silyl groups and carbonyl groups. If hydrogen termination is used, the hydrogenation step may be carried out in the absence of hydrocarbon lithium and alkoxy lithium compounds. No more than 0.02 m moles of catalyst per gram of copolymer can be used. If hydrogen termination is used, then no more than 0.003 mM of catalyst per gram of polymer may be used. If more is used, the selectivity of the hydrogenation drastically decreases and the desired partially hydrogenated diene blocks may not be created.

Specific bis(cyclopentadienyl) compounds which may be used in the present invention include bis(cyclopentadienyl)titanium dichloride, bis-(cyclopentadienyl)titaniumdibromide, bis(cyclopentadienyl)titaniumdiiodide, bis(cyclopentadienyl)titanium difluoride, bis(cyclopentadienyl)titanium dicarbonyl, bis(cyclopentadienyl)titanium dimethyl, bis(cyclopentadienyl)titanium diethyl, bis(cyclopentadienyl)titanium dibutyl (including n-butyl, sec-butyl tert-butyl), bis(cyclopentadienyl)titanium bis(trimethylsilylmethyl), bis(cyclopentadienyl)titanium dibenzyl, bis(cyclopentadienyl)titanium dihexyl, bis(cyclopentadienyl)titanium dimethoxide, bis(cyclopentadienyl)titanium diethoxide, bis(cyclopentadienyl)titanium dibutoxide, bis(cyclopentadienyl)titanium dipentoxide, bis(cyclopentadienyl)titanium dineopentoxide, bis(cyclopentadienyl) titanium diphenoxide, and all mixtures thereof. The preferred titanium compound is bis(cyclopentadienyl) titanium dichloride because of ease of handling, air stability and commercial availability.

This process will selectively hydrogenate ethylenic unsaturation which is not between double bound backbone carbons of which at least one is substituted, without appreciably hydrogenating alkenyl aromatic hydrocarbons or backbone ethylenic unsaturation wherein at least one of the doubly bound carbon atoms is substituted. Hydrogenation of the ethylenic unsaturation which is not between doubly bound backbone carbons of which at least one is substituted to degrees of greater than 50% are easily obtained but is has been found that in order to achieve hydrogenation percentages of greater than 95% as is often desired, the alkali metal (for example, lithium) to titanium ratio must be at least about 2:1 and preferably is from about 3 to 30. There has to be sufficient alkali metal to ensure quick and sufficient interaction between the two metals. A high viscosity (high molecular weight) polymer may require a higher ratio because of the lesser mobility of the metals in the polymer cement. If alkali metal hydride must be added to increase the ratio, it can be made in situ by adding an organo alkali metal compound and hydrogen to the polymer (i.e., sparge), either before or after termination of the polymerization.

It is generally desirable to achieve hydrogenation of the ethylenic unsaturation which is not between doubly bound backbone carbons wherein at least one of the doubly bound carbons is substituted of greater than 95% with even as much as 99% being possible. The amount of residual unsaturation left in the polymer then depends primarily upon the amount of substituted 1,4 polymerization which takes place and secondarily, the hydrogenation conditions used including, but not inclusive to, catalyst concentration, temperature, pressure, mixing and reaction time. Generally, no more than 40% of such double bonds will be hydrogenated.

In general, the hydrogenation is carried out in a suitable solvent at a temperature within the range of from about 0° to about 120° C., preferably about 60° to about 90° C., and at a hydrogen partial pressure within the range from about 1 psig to about 1200 psig, preferably from about 100 to about 200 psig. contacting at hydrogenation conditions is generally continued for a period of time within the range from about 30 to about 360 minutes. Suitable solvents for hydrogenation include, among others, n-heptane, n-pentane, tetrahydrofuran, cyclohexane, toluene, hexane and benzene. Because of the small amount of catalyst present in the polymer after hydrogenation, it is not necessary to separate the hydrogenation catalyst and catalyst residue from the polymer. However, if separation is desired, it may be carried out using methods well known in the prior art. Hydrogenation may be carried out in other manners such as batch processes, continuous processes, and semi-continuous processes.

EXAMPLE 1

A 350 lb. batch of polystyrene-polybutadiene-polyisoprene sequential block copolymer 39,600 molecular weight was made by anionic polymerization using sec-butyllithium as an initiator in a 150 gallon pressurized reactor. The polymer contained approximately 17%w polystyrene, 31%w 1,2-polybutadiene, 44%w 1,4-polybutadiene, 5%w 1,4-polyisoprene and 3%w 3,4-polyisoprene. The polymerization took place in a mixture of cyclohexane and diethyl ether. The resulting polymer solution contained 20% polymer by weight.

At the end of the polymerization reaction, the reactor temperature was approximately 60° C. The reactor was sparged and vigorously mixed with hydrogen for approximately 30 minutes.

EXAMPLE 2

A 350 lb. batch of polystyrene-(polybutadiene-/polyisoprene) copolymer was made by anionic polymerization using sec-butyllithium as an initiator in a 150 gallon pressurized reactor. The polystyrene block was a discrete block of polystyrene and the diene block was a random copolymerization of butadiene and isoprene. The resulting polymer was 37,100 molecular weight and contained approximately 19%w polystyrene, 26%w 1,2-polybutadiene, 45%w 1,4-polybutadiene, 5%w 1,4-polyisoprene and 5%w 3,4-polyisoprene. The polymerization took place in a mixture of cyclohexane and diethyl ether. The resulting polymer solution contained 20% polymer by weight.

At the end of the polymerization reaction, the reactor temperature was approximately 60° C. The reactor was sparged and vigorously mixed with hydrogen for approximately 30 minutes.

EXAMPLES 3-6

Hydrogenation of a hydrogen terminated polymer with varying amounts of $Cp_2TiCl_2$ catalyst All hydrogenation runs were carried out under similar conditions unless otherwise noted. A typical experimental hydrogenation run consisted of pressure transferring to a 4-liter reactor 1560 grams of the 20% by weight solution of polymer. The temperature of the reactor was maintained at 75° C. and the reactor pressured to 240 psig with hydrogen. At this point, bis(cyclopentadienyl)titanium dichloride ($Cp_2TiCl_2$) was added to the reactor as a cyclohexane solution. The reaction was allowed to run for 3 hours, during which time samples were drawn from the reactor and analyzed by proton NMR to determine the remaining distribution of olefinic double bonds. In the cases where 0.33 mM catalyst was used, the remaining olefinic double bonds were primarily associated with the polyisoprene.

EXAMPLE 3

The polymer of Example 1 was hydrogenated with 0.12 mM of the $Cp_2TiCl_2$ catalyst. The amount catalyst per polymer weight was 0.00038 mM per gram of polymer.

|                 | After Hydrogenation | Percent Hydrogenated |
|-----------------|---------------------|----------------------|
| 1,2-polybutadiene | 0.1% w            | 99.7                 |
| 1,4-polybutadiene | 6% w              | 86.4                 |
| 1,4-polyisoprene  | 5% w              | 0                    |
| 3,4-polyisoprene  | 3% w              | 0                    |

The total olefinic conversion was 85% and the remaining olefinic unsaturation was 2.3 meq/g.

EXAMPLE 4

The polymer of Example 1 was hydrogenated with 0.33 mM of the $Cp_2TiCl_2$ catalyst (0.001 mM per gram of polymer). The polymer solution was 20% by weight polymer. The proton NMR results of the 3 hour sample follow:

|                 | After Hydrogenation | Percent Hydrogenated |
|-----------------|---------------------|----------------------|
| 1,2-polybutadiene | <0.1% w           | >99.7                |
| 1,4-polybutadiene | 0.8% w            | 98.2                 |
| 1,4-polyisoprene  | 5% w              | 0                    |
| 3,4-polyisoprene  | 1% w              | 66.7                 |

The total olefinic conversion was 93% and the remaining olefinic unsaturation was 1 meq/g.

EXAMPLE 5

The polymer of Example 2 was hydrogenated with 0.12 mM of the $Cp_2TiCl_2$ catalyst (0.00038 Mm per gram of polymer). The polymer solution was 20% by weight polymer. The proton NMR results of the 3 hour sample follow:

|                 | After Hydrogenation | Percent Hydrogenated |
|-----------------|---------------------|----------------------|
| 1,2-polybutadiene | 0.8% w            | 96.9                 |
| 1,4-polybutadiene | 14% w             | 68.9                 |
| 1,4-polyisoprene  | 4% w              | 20                   |
| 3,4-polyisoprene  | 5% w              | 0                    |

The total olefinic conversion was 73% and the remaining olefinic unsaturation was 4 meq/g. Comparison of Examples 5 and 3 shows the difference in selectivity of isoprene hydrogenation between a random (Example 5) and homopolymer (Example 3) diene block.

EXAMPLE 6

The polymer of Example 2 was hydrogenated with 0.33 mM of the $Cp_2TiCl_2$ catalyst (0.001 mM per gram of polymer). The polymer solution was 20% by weight polymer. The proton NMR results of the 3 hour sample follow:

|                 | After Hydrogenation | Percent Hydrogenated |
|-----------------|---------------------|----------------------|
| 1,2-polybutadiene | <0.1% w           | >99.6                |
| 1,4-polybutadiene | 0.4% w            | 99.1                 |
| 1,4-polyisoprene  | 3% w              | 40                   |
| 3,4-polyisoprene  | 3% w              | 0                    |

The total olefinic conversion was 93% and the remaining olefinic unsaturation was 1 meq/g. Comparison of Examples 4 and 6 shows the difference in selectivity of isoprene hydrogenation between a random (Example 6) and homopolymer (Example 4) diene block.

EXAMPLE 7

A 350 lb. batch of polystyrene-(polybutadiene-/polyisoprene) copolymer was made by anionic polymerization using sec-butyllithium as an initiator in a 150 gallon pressurized reactor. The polystyrene block was a discrete block of polystyrene and the diene block was a random copolymerization of butadiene and isoprene. The resulting polymer was 96,700 molecular weight and contained approximately 20%w polystyrene, 25%w 1,2-polybutadiene, 42%w 1,4-polybutadiene, 6.5%w 1,4-polyisoprene, and 6.5%w 3,4-polyisoprene. The polymerization took place in a mixture of cyclohexane and diethyl ether. The resulting polymer solution contained 20% polymer by weight.

At then end of the polymerization reaction, the reaction was terminated with a 1.1 molar ratio of methanol to sec-butyllithium.

EXAMPLE 8

The polymer was prepared in the same manner as Example 7, but the composition of the polymer was changed. The resulting polymer was 93,100 molecular weight and contained approximately 20%w polystyrene, 20%w 1,2-polybutadiene, 35%w 1,4-polybutadiene, 12%w 1,4-polyisoprene, and 13%w 3,4-polyisoprene.

EXAMPLES 9-11

Hydrogenation of methanol terminated polymer with varying amounts of $Cp_2TiCl_2$ catalyst All hydrogenation runs were carried out under similar conditions unless otherwise noted. A typical experimental hydrogenation run consisted of pressure transferring to a 4-liter reactor 780 grams of the 20% by weight solution of polymer and 780 grams of cyclohexane so that the resulting polymer solution in the reactor was 10% by weight. The temperature of the reactor was maintained at 40° C. and the reactor pressure maintained at 70 psig with hydrogen. At this point, 7.5 mM of sec-butyllithium was added to the reactor and allowed to mix for about 10 minutes. The $Cp_2TiCl_2$ was added to the reactor as a toluene solution. The reaction was allowed to run for 3 hours, during which time samples were drawn from the reactor and analyzed by proton NMR to determine the remaining distribution of olefinic double bonds.

EXAMPLE 9

The polymer of Example 7 was hydrogenated with 1 mM of the $Cp_2TiCl_2$ catalyst or 0.0064 mM of catalyst per gram of polymer. The polymer solution was 10% by weight polymer.

The proton NMR results of the 3 hour sample follow:

|  | After Hydrogenation | Percent Hydrogenated |
|---|---|---|
| 1,2-polybutadiene | 0% w | 100 |
| 1,4-polybutadiene | 0.1% w | 99.8 |
| 1,4-polyisoprene | 3.4% w | 46.7 |
| 3,4-polyisoprene | 0.7% w | 89.2 |

The total olefinic conversion was 95.6% and the remaining olefinic unsaturation was 0.6 meq/g.

EXAMPLE 10

The polymer of Example 7 was hydrogenated as described above with 2.5 mM of titanium bis(cyclopentadienyl)dichloride catalyst or 0.016 mM of catalyst per gram of polymer. The proton NMR results of the 3 hour sample follow:

|  | After Hydrogenation | Percent Hydrogenated |
|---|---|---|
| 1,2-polybutadiene | 0% w | 100 |
| 1,4-polybutadiene | 0.1% w | 99.8 |
| 1,4-polyisoprene | 3.5% w | 46.2 |
| 3,4-polyisoprene | 1% w | 84.6 |

The total olefinic conversion was 95.2% and the remaining olefinic unsaturation was 0.7 meq/g.

EXAMPLE 11

The polymer of Example 8 was hydrogenated as described above with 2.5 mM of titanium bis(cyclopentadienyl)dichloride catalyst or 0.016 mM of catalyst per gram of polymer. The proton NMR results of the 3 hour sample follow:

|  | After Hydrogenation | Percent Hydrogenated |
|---|---|---|
| 1,2-polybutadiene | 0% w | 100 |
| 1,4-polybutadiene | 0.3% w | 99.1 |
| 1,4-polyisoprene | 9.7% w | 19.2 |
| 3,4-polyisoprene | 5.6% w | 56.9 |

The total olefinic conversion was 83.6% and the remaining olefinic unsaturation was 2.3 meq/g.

EXAMPLE 12

Hydrogenation of Methanol Terminated Polymer with Nickel/Aluminum Hydrogenation Catalyst This example shows that the $Cp_2TiCl_2$ catalyst will selectively hydrogenate the ethylenic unsaturation which is not between doubly bound backbone carbons wherein at least one of the doubly bound carbons is substituted to a greater degree than a nickel/aluminum catalyst by comparison with Example 9. The nickel/aluminum catalyst was prepared in a cyclohexane solution by the reaction of nickel 2-ethyl-1-hexanoate and triethyl aluminum such that the molar ratio of the aluminum:nickel was 2.1.

The hydrogenation run consisted of pressure transferring to a 4-liter reactor 780 grams of the 20% by weight solution of the polymer of Example 7 and 780 grams of cyclohexane so that the resulting polymer solution in the reactor was 10% by weight. The temperature of the reactor was maintained at 40° C. and the reactor pressure maintained at 70 psig with hydrogen. At this point, the nickel/aluminum catalyst was added to the reactor. The reaction was allowed to run for 3 hours, during which time samples were drawn from the reactor and analyzed by proton NMR to determine the remaining distribution of olefinic double bonds.

The polymer of Example 7 was hydrogenated with 1 mM nickel per gram of polymer. The proton NMR results of the 3 hour sample follow:

|  | After Hydrogenation | Percent Hydrogenated |
|---|---|---|
| 1,2-polybutadiene | 0% w | 100 |
| 1,4-polybutadiene | 0.3% w | 99.3 |
| 1,4-polyisoprene | 2.5% w | 61.5 |
| 3,4-polyisoprene | 2.2% w | 66.2 |

The total olefinic conversion was 94.7% and the remaining olefinic unsaturation was 0.7 meq/g. Comparing this example with Example 9, it is seen that the titanium catalyst hydrogenates more of the 3,4-polyisoprene and less of the 1,4-polyisoprene which is the desired result for partial hydrogenation.

We claim:

1. A process for the partial hydrogenation of conjugated diolefin polymers which comprises:
   (a) copolymerizing at least one substituted conjugated diolefin and at least one unsubstituted diolefin with an organo-alkali metal polymerization initiator in a suitable solvent thereby creating a living polymer comprising (1) ethylenic unsaturation between backbone carbons where at least one of the doubly bound backbone carbons is substituted and (2) ethylenic unsaturation which is not between doubly bound backbone carbons wherein at least one is substituted;
   (b) terminating the polymerization; and
   (c) selectively hydrogenating the ethylenic unsaturation which is not between doubly bound backbone carbons wherein at least one is substituted, by contacting the polymer with hydrogen in the presence of no more than 0.02 millimoles of catalyst per gram of polymer of a catalyst of the formula:

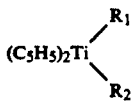

wherein $R_1$ and $R_2$ are the same or different and are selected from the group consisting of halogen groups, $C_1$–$C_8$ alkyl and alkoxy groups, $C_6$–$C_8$ aryloxy groups, aralkyl, cycloalkyl groups, silyl groups and carbonyl groups.

2. The process of claim 1 wherein the hydrogenation is carried out at a temperature from about 0° C. to about 120° C. and a pressure of from about 1 psig to about 1200 psig and the contacting takes place for a period of time within the range from about 15 to about 1440 minutes.

3. The process of claim 2 wherein the hydrogenation is carried out at a temperature from about 60°–90° C. and a pressure from about 100–200 psig, the metal hydride to titanium molar ratio is from about 3–30 and the contacting takes place for a period of time from about 30 to 360 minutes.

4. The process of claim 1 wherein the alkali metal initiator is an organo lithium compound.

5. The product of the process of claim 1.

6. The process of claim 1 wherein the titanium compound is selected from the group consisting of bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium dicarbonyl, bis(cyclopentadienyl)titanium dimethyl, bis(cyclopentadienyl)titanium diethyl, bis(cyclopentadienyl)titanium dibutyl, bis(cyclopentadienyl)titanium bis(trimethylsilylmethyl), bis(cyclopentadienyl)titanium dibenzyl, bis(cyclopentadienyl)titanium dihexyl, bis(cyclopentadienyl)titanium dimethoxide, bis(cyclopentadienyl)titanium diethoxide, bis(cyclopentadienyl)titanium dibutoxide, bis(cyclopentadienyl)titanium dipentoxide, bis()cyclopentadienyl)titanium dineopentoxide, bis(cyclopentadienyl)titanium diphenoxide and all mixtures thereof.

7. The process of claim 6 wherein the titanium compound is bis(cyclopentadienyl)titanium dichloride.

8. The process of claim 6 wherein the alkali metal initiator is an organo lithium compound.

9. The process of claim 8 wherein the organo lithium compound is sec-butyllithium.

10. The process of claim 1 wherein a metal hydride is created in-situ by the termination of the living polymer with hydrogen and the amount of catalyst is no more than 0.003 mM of catalyst per gram of polymer.

11. The process of claim 10 wherein lithium hydride is created in-situ by termination of the living polymer.

12. The process of claim 1 wherein the alkali metal:titanium metal ratio during the hydrogenation is at least 2:1.

13. The process of claim 1 wherein the unsubstituted conjugated diolefin is butadiene and the substituted conjugated diolefin is isoprene.

14. The process of claim 1 wherein the diolefins are copolymerized with a vinyl aromatic hydrocarbon.

15. The process of claim 14 wherein the diolefin is copolymerized with styrene.

16. The process of claim 15 wherein the copolymer is a block copolymer having at least one mixed conjugated diene polymer block and at least one styrene block.

17. The process of claim 1 wherein at least 95% of the ethylenic unsaturation which is not between doubly bound backbone carbons wherein at least one is substituted, are hydrogenated.

18. A process for the partial hydrogenation of conjugated diolefin polymers which comprises:
(a) polymerizing a substituted conjugated diolefin with an organo-alkali metal polymerization initiator in a suitable solvent thereby creating a living polymer which comprises (1) ethylenic unsaturation between backbone carbons where at least one of the doubly bound backbone carbons is substituted and (2) ethylenic unsaturation which is not between doubly bound backbone carbons, at least one of which is substituted;
(b) terminating the polymerization with hydrogen; and
(c) selectively hydrogenating the ethylenic unsaturation which is not between doubly bound backbone carbons, at least one of which is substituted, by contacting the polymer with hydrogen in the presence of no more than 0.003 millimoles of catalyst per gram of polymer of a catalyst of the formula:

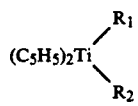

wherein $R_1$ and $R_2$ are the same or different and are selected from the group consisting of halogen groups, $C_1$–$C_8$ alkyl and alkoxy groups, $C_6$–$C_8$ aryloxy groups, aralkyl, cycloalkyl groups, silyl groups and carbonyl groups.

19. The process of claim 18 wherein the conjugated diolefin is isoprene.

20. The product of the process of claim 18.

* * * * *